United States Patent [19]

Hirano et al.

[11] Patent Number: 5,109,973
[45] Date of Patent: May 5, 1992

[54] FREE FLOWING PRODUCTION SYSTEM

[75] Inventors: Takashi Hirano; Hiroshi Yamaga, both of Abiko, Japan

[73] Assignee: Hitachi Seiki Co., Ltd., Abiko, Japan

[21] Appl. No.: 462,338

[22] Filed: Jan. 2, 1990

Related U.S. Application Data

[63] Continuation of Ser. No. 238,146, Aug. 30, 1988, abandoned.

[30] Foreign Application Priority Data

Sep. 3, 1987 [JP] Japan ................ 62-221029

[51] Int. Cl.⁵ .............................................. B65G 43/00
[52] U.S. Cl. .................................. 198/341; 198/352; 198/350; 198/465.1
[58] Field of Search ............... 198/341, 349, 350, 352, 198/465.1, 465.2, 465.3, 803.01

[56] References Cited

U.S. PATENT DOCUMENTS

| | | | |
|---|---|---|---|
| 3,530,571 | 9/1970 | Perry | 198/349 X |
| 3,854,889 | 12/1974 | Lemelson | 198/341 X |
| 4,460,966 | 9/1984 | Chynoweth et al. | 198/341 X |
| 4,484,289 | 11/1984 | Hemond | 198/341 X |
| 4,503,596 | 3/1985 | Ida et al. | 198/341 X |

FOREIGN PATENT DOCUMENTS 8706563 11/1987 PCT Int'l Appl. ................ 198/350

Primary Examiner—D. Glenn Dayoan
Attorney, Agent, or Firm—Cushman, Darby & Cushman

[57] ABSTRACT

A free flowing production system includes disposing a variety of automatic production machines along a free flowing conveyance apparatus; detachably attaching each card on which the contents on production are written to a pallet on which articles to be conveyed by the free flowing conveyance apparatus are placed; disposing card read/write devices to or adjacent to the automatic production machines; and providing control devices which cause requisite works to be conducted in accordance with the contents read, and causes the contents conducted to be written on the card after conducting, whereby the automatic production machines are caused to conduct the remained portions of the contents written on the card which are to be applied to the articles which are being conveyed and which have been transported from the free flowing conveyance apparatus to the automatic production machines.

7 Claims, 15 Drawing Sheets

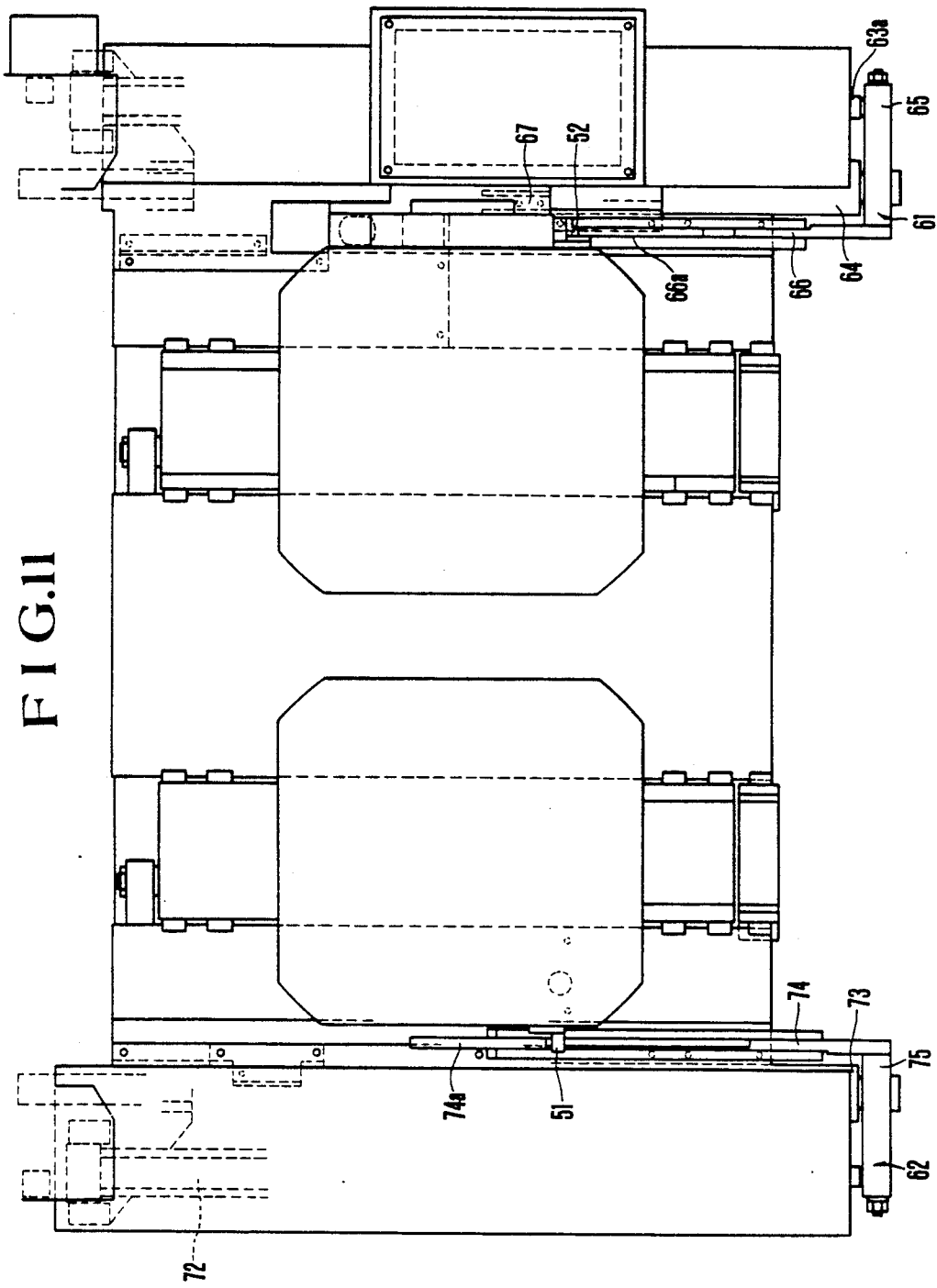

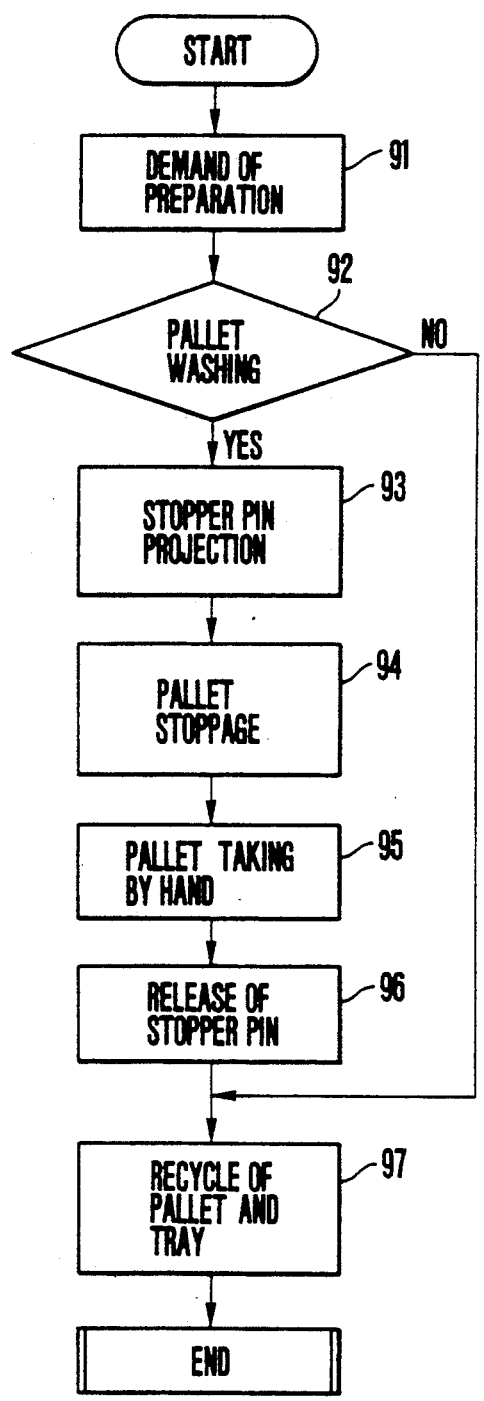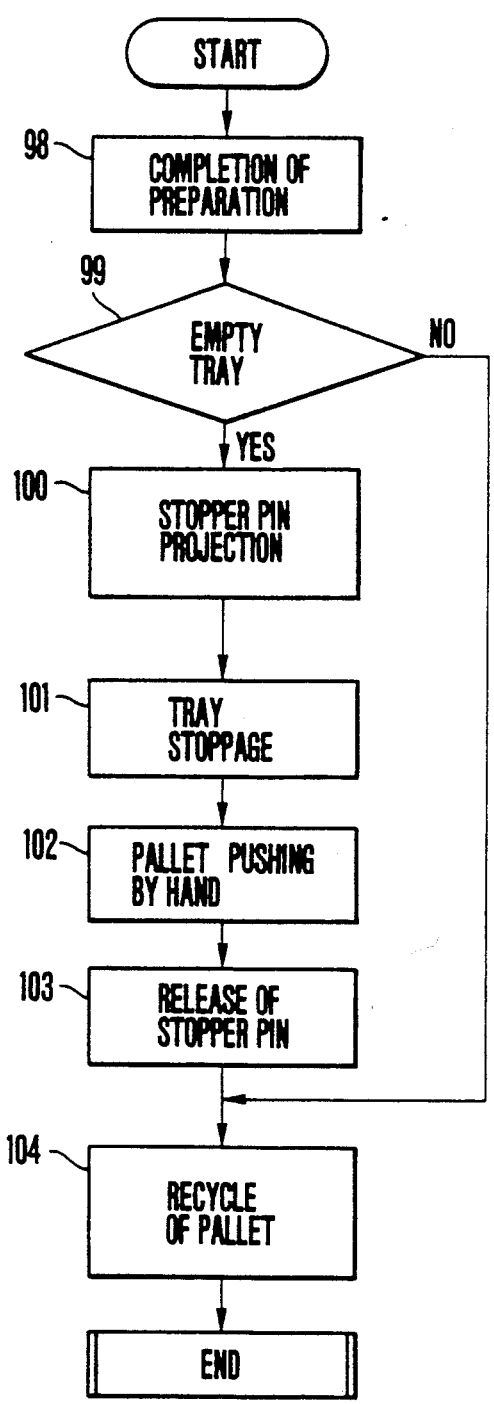

FREE FLOWING PRODUCTION SYSTEM

This is a continuation of application No. 07/238,146, filed Aug. 30, 1988 now abandoned.

BACKGROUND OF THE INVENTION

1. FIELD OF THE INVENTION

This invention relates to a free flowing production system which is constituted in such a manner that various automatic production machines are disposed along a free flowing type of conveyance apparatus.

2. DESCRIPTION OF THE PRIOR ART

It has been variously assumed that the plant facilities may be automated to degrees, starting at a small scale with machine tools being automated and extending to a large scale to automation in which the whole plant is automated. The relatively large scale automated production facilities are known in which the manufacturing lines are completely automated. The adoption of such types of automated facilities have recently become much wider practice.

For example, an automated machining line system previously disclosed and supplied by the applicant of the present invention is constituted in such a manner that, as shown in FIG. 25: a plurality of floor-type machining centers 3 and lateral-type machining centers 4 are disposed adjacent to an unmanned track conveyance apparatus 2 in which article to be produced are placed on a large unmanned transportation vehicle 1 which reciprocates along the track; a tool preparation station 5 and product preparation station 6 are disposed adjacent to the machining centers 3 and 4 along the unmanned track conveyance apparatus 2; a frame 7 for storing a variety of pallets and other product preparation stations 8 are disposed on the side opposing the machining centers 3 and 4 of the unmanned track conveyance apparatus 2 for the purpose of facilitating introduction and delivery of products which have been placed on the pallet; a large scale jig setting station 9 is disposed adjacent to the product preparation stations 8; and a large sized article reversing device 9a and an automated carrier car 9b are disposed on the ground for the purpose of facilitating preparation work, whereby a system 10 is formed in which a large amount of large products conveyed by the unmanned track conveyance apparatus 2 can be efficiently machined. On the other hand, in order to machine medium and small sized falt and square articles, an unmanned track conveyance apparatus 11 and a stacker crane 12 are disposed parallel to each other; lateral machining centers 13, vertical machining centers 14, washing devices 15 and a tool robot 16 are disposed in a line along the side of the unmanned track conveyance apparatus 11; and a multi-stage type of pallet stocker 15 is disposed on the side opposing the machining centers 13 and 14 of the unmanned track conveyance apparatus 11 along the side of the stacker crane 12, whereby a system 18 is constituted in which jigs and product preparation stations 17 are located at the end portion of the multi-stage type of pallet stocker 15 which is provided along the side of the stacker crane 12. In order to machine medium and small round-shaped articles, a system 29 is constituted in such a manner that: unmanned track conveyance apparatus 21 are disposed to form two parallel lines; NC machine tools 22 and a lateral-type machining center 23 are disposed along either line; an automatic tool supplying device 26 having a tool magazine 24 and a tool loader 25 is disposed behind the NC machine tools 22; and pallet storing frames 27 are disposed along the side on which no NC machine tools 22 is disposed, whereby the preparation station 28 is located to one end of the pallet storing frame 27.

The above-described systems are concentrically controlled by on-line controllers 10a, 18a and 29a disposed in a central control room 30 disposed in a suitable position within the plant so that large amounts of products can be efficiently machined by utilizing a 24-hour continuous operation. Such a system forms a flexible unmanned machining system in which mass production can be conducted, and a multiplicity of types of production as well as small quality production can be conducted in accordance with the dimensions and shapes of the articles to be machined.

In the above-described unmanned machining systems 10, 18 and 29, since all of the control information is concentrically controlled by the on-line controllers 10a, 18a and 29a in the central control room 30, if the sequential conveying order of the materials, products and other articles to be produced is changed for some reason, the subject matter to be controlled becomes disordered, necessitating the changing work of the control data utilized in the on-line controllers 10a, 18a and 29a. Furthermore, changes need to be effected in the preparation work, defective products may be generated, and/or too much time is taken to trouble shoot. Thus cases may occur where the operation of the unmanned machining systems 10, 18 and 29 needs to be suspended.

SUMMARY OF THE INVENTION

An object of the present invention is therefore to provide a free flowing production system in which the above problems can be overcome by, from the technical view-point, enabling machining and other production work to be conducted regardless of the sequential order of the articles which are being conveyed.

As a means for overcoming the above described problems, a free flowing production system is formed in such a manner that a variety of automatic production machines are disposed along a free flowing conveyance apparatus, cards on which data on production is written are detachably attached to pallets on which the articles to be conveyed by the above-described free flowing conveyance apparatus are placed, card-read/write devices are disposed to or adjacent to each of the above-described automatic production machines, a control device is provided for the requisite tasks to be conducted in accordance with the data read out, and after the requisite tasks have been conducted, said data on the tasks conducted are written in the above-described cards, whereby the tasks remaining to be done on the articles being conveyed and passed from the above-described free flowing conveyance apparatus to the above-described automatic production machine are conducted by the above-described automatic production machines.

According to the present invention, a variety of articles which are being conveyed by a free flowing conveyance apparatus are optionally taken with the pallets on which the articles are placed by automatic production machines which can pass and receive the articles to be produced. The cards attached to the pallets are read so that the remaining contents to be done with the article which are written on the cards are, to the degree which can be conducted by the subject machine, conducted by the machine, and the data written on the cards are changed in accordance with the contents conducted by the subject automatic production machine. The articles are again returned to the free flowing conveyance apparatus, whereby the article to be produced can be taken by the other automatic production machines in accordance with the degree of emptiness of the automatic production machine, and the contents written on the cards attached to the pallets can be conducted by the automatic production machines to the degree of capability of the automatic production machines. Therefore, the article to be produced can be automatically controlled in response to information written on the card attached to the pallet to be produced which are being conveyed by the free flowing conveyance apparatus. Consequently, the necessity of concentric control of all of the articles to be produced becomes unnecessary, therefore the production control can be conducted more flexibly. Furthermore, the operation rate of the system can be improved and the rate of defective products can be reduced.

According to the invention, a free flowing production system is provided that has at least one pallet adapted to hold a workpiece thereon. A plurality of the pallets are formed on an endless running conveying apparatus, and therefore this apparatus has workpieces in finished and unfinished conditions that are mixed on a surface of the conveying apparatus. A tray is adapted to hold the pallet and is directly placed on the surface of the conveying apparatus. The tray is formed such that the pallet can be introduced and ejected from the tray for beginning and ending production of the workpiece. At least one shifting device is provided on each pallet and the shifting device has an adjustable position structure which has a position which can be moved between projecting or not projecting by manual or automatic operations. A variety of automatic productions machines are disposed along the conveying apparatus, and each machine has a means for introducing and ejecting a workpiece. Each of the machines also has means for moving the position of a shifting device on the pallet to shift this position when the machine finishes its production process. An information apparatus is adjacent to the means for introducing and ejecting the pallet and determines information indicative of the position of the shifting device and allows the pallet to proceed to a machine only when the position is not shifted. An information card is detachably attached to the pallet and is capable of repeated reading and writing operations. This information card includes means for storing information indicative of an operation to be performed to the workpiece on the pallet on a particular machine. A read/write apparatus is placed near the means for introducing and ejecting the pallet and is for reading and writing to the information card. A control means is also provided for transmitting the information read from the information card to the machine and for operating the machine based thereon and writing information indicative of the operating to the information card. IN this way, the information card is written from a state indicative of an unfinished condition to a state indicative of a finished condition when the operation is completed.

BRIEF DESCRIPTION OF THE DRAWINGS

FIG. 1 to 24 illustrate embodiments of the present invention wherein:

FIG. 1 is a plan view illustrating a free flowing production system;

FIG. 2 is a side elevational view illustrating the free flowing conveyance apparatus;

FIG. 3 is a partial enlarged plan view illustrating positions at which the conveyance apparatus is stopped;

FIG. 4 is a partial enlarged side elevational view illustrating positions at which the conveyance apparatus is stopped;

FIG. 5 is a plan view of a pallet;

FIG. 6 is a rear view of the pallet;

FIG. 7 is a right side elevational view of the pallet;

FIG. 8 is a left side elevational view of the pallet;

FIG. 9 is an enlarged vertical cross-sectional view of the part shown by the VI—VI lines in the FIG. 5.

FIG. 10 is a vertical cross-sectional view of a spring plunger;

FIG. 11 is a partial enlarged plan view of an introduction device and a delivery device;

FIG. 12 is a partial enlarged front view of the introduction device and the delivery device;

FIG. 13 is a partial cross-sectional view of a pallet pressing member of the introduction device;

FIG. 14 is a partial cross-sectional view of the pallet pressing member of the delivery device;

FIG. 15 is a partial enlarged plan view illustrating a state wherein a cover of the introduction device is removed;

FIG. 16 is a partial enlarged side elevational view of a dog pin pressing device;

FIG. 17 is a partial enlarged side elevational view illustrating a state wherein the dog pin is pressed downwardly by the dog pin pressing member;

FIG. 18 is a front view of a card;

FIG. 19 is a flow chart illustrating a process at the time of preparation is required:

FIG. 20 is a flow chart illustrating a process at the time of completion of preparation;

FIG. 21 is a flow chart illustrating processes of introduction and delivery to and from each device;

FIG. 22 is a concept view illustrating flow of information by means of a card;

FIG. 23 illustrates flow of information according to the embodiment;

FIG. 24 illustrates flow of information in a case wherein a plurality of devices of the same type are disposed.

DESCRIPTION OF THE PREFERRED EMBODIMENTS

Figure 1:
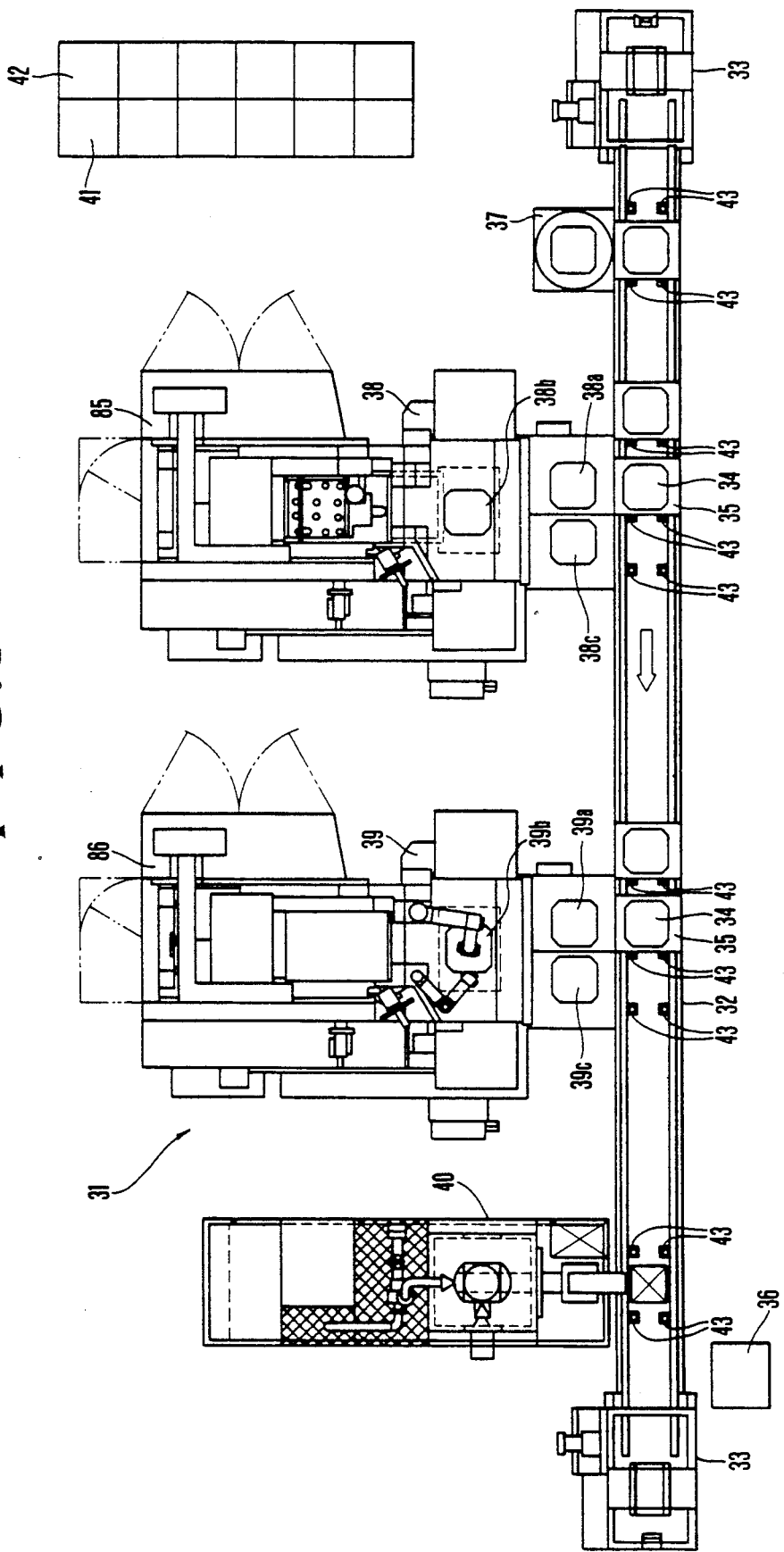
Figure 2:
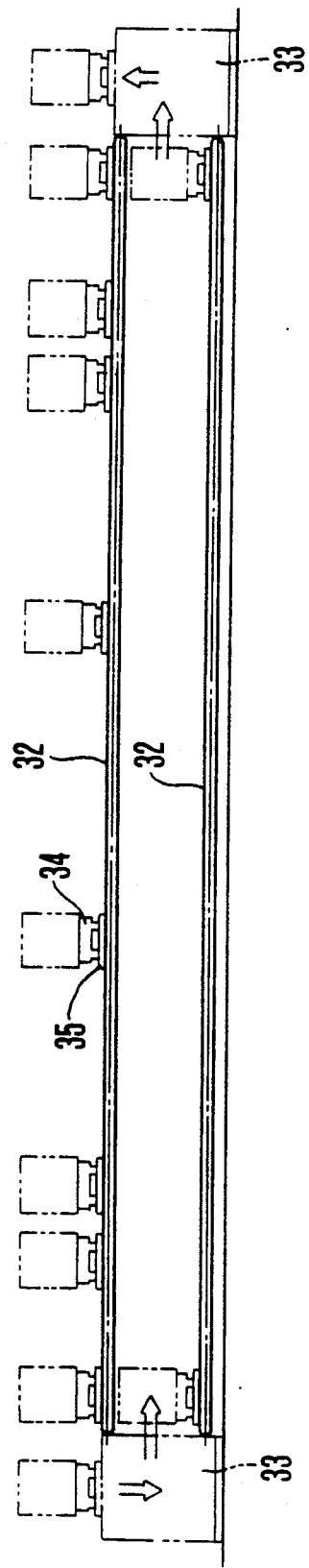
Figure 10:
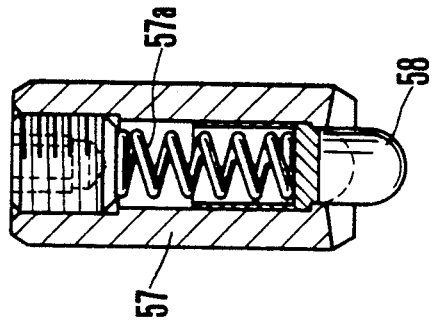
Figure 9:
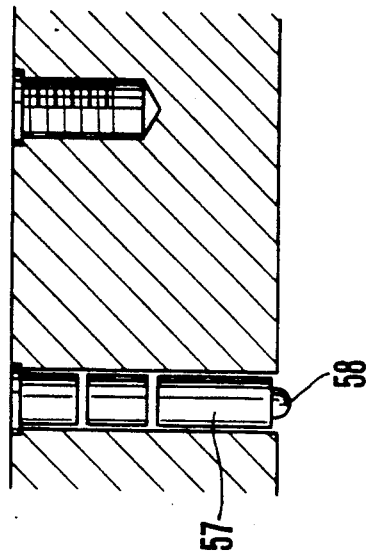
Figure 3:
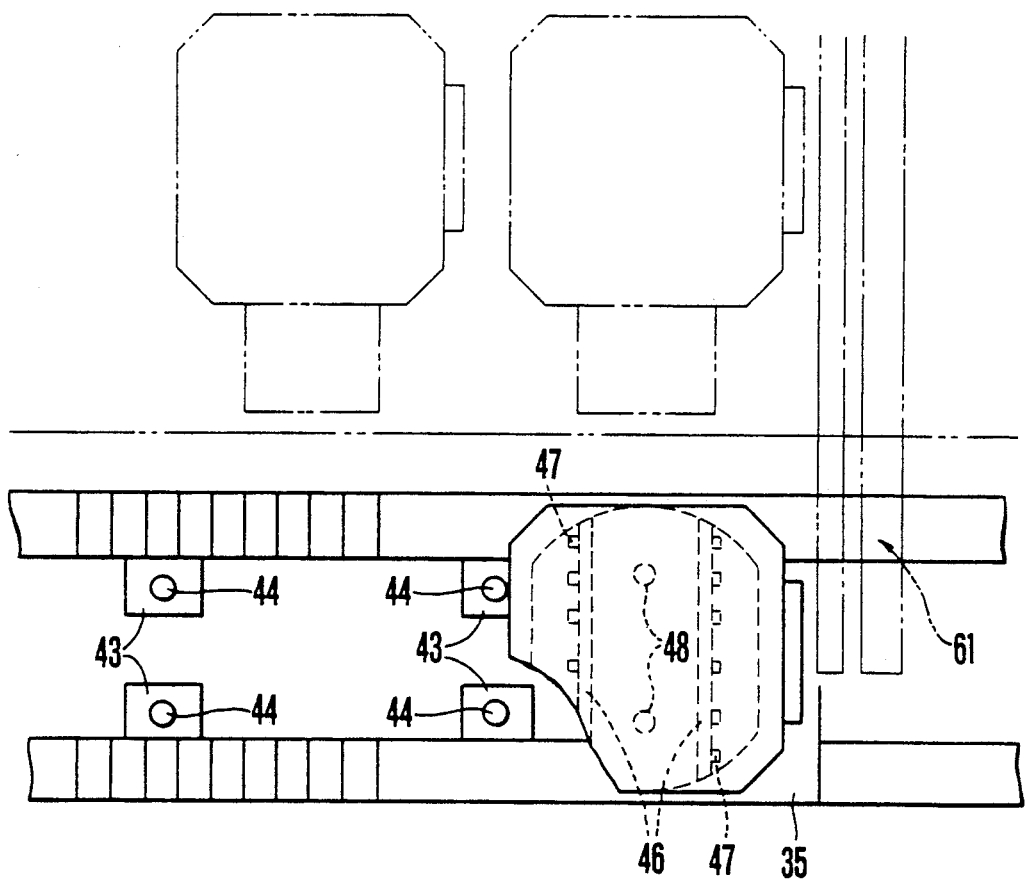
Figure 4:
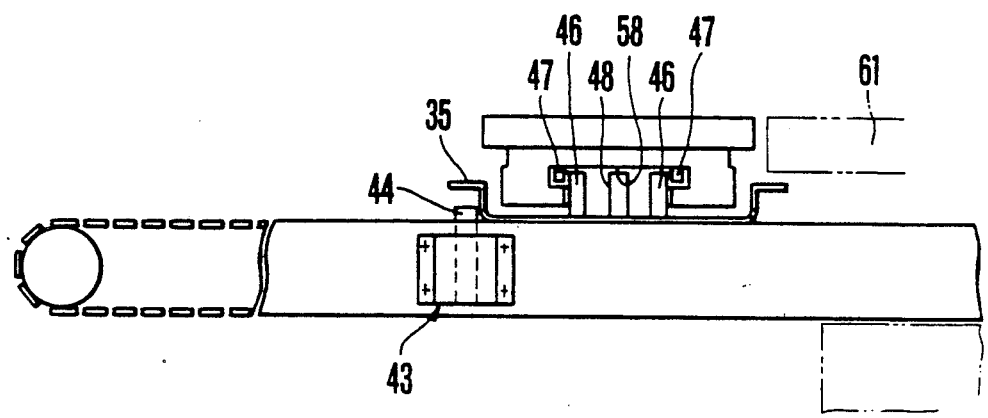
Figure 5:
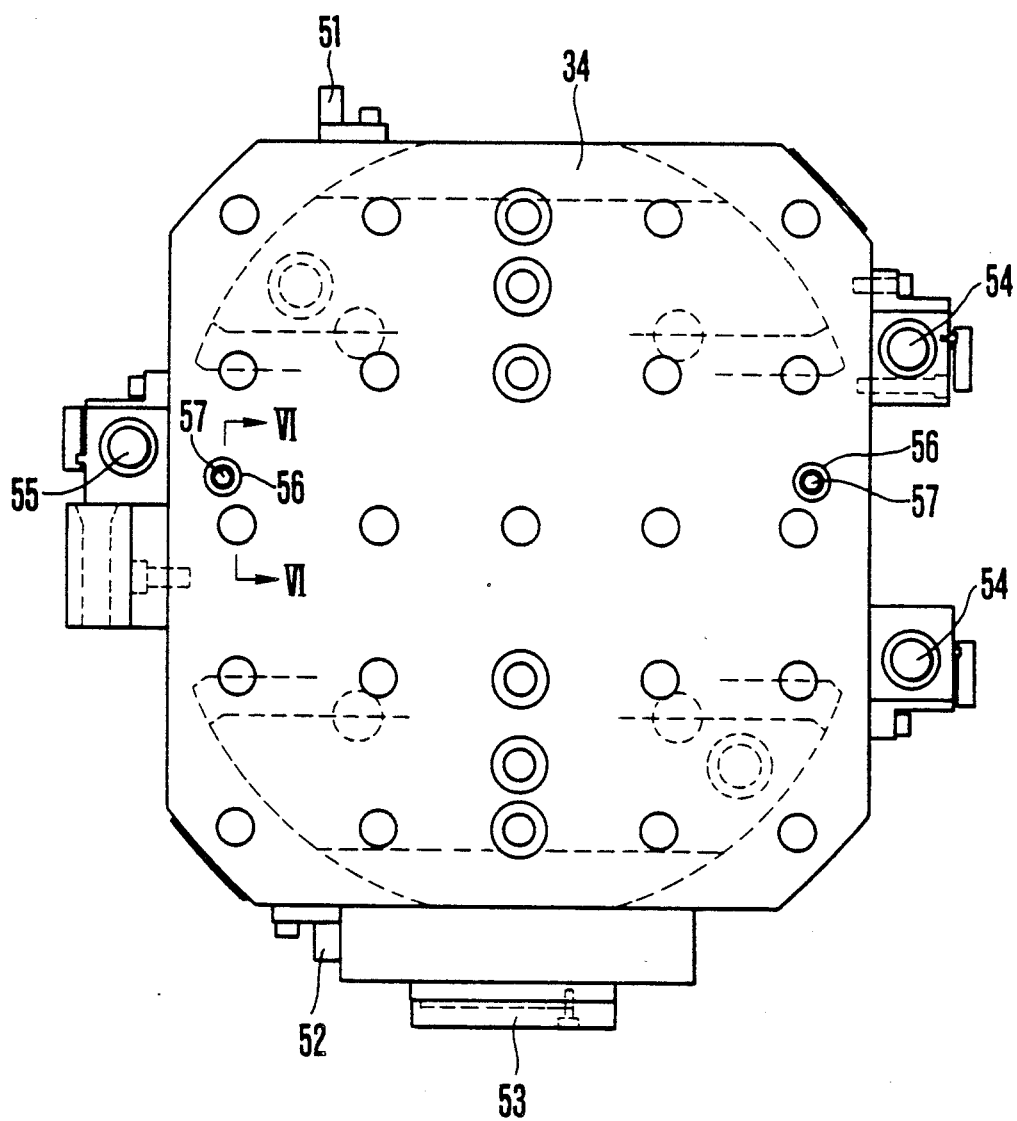
Figure 6:
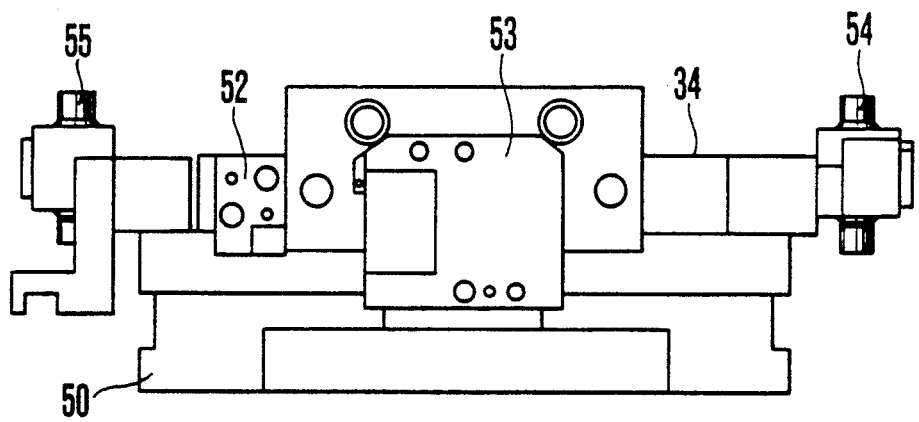
Figure 7:
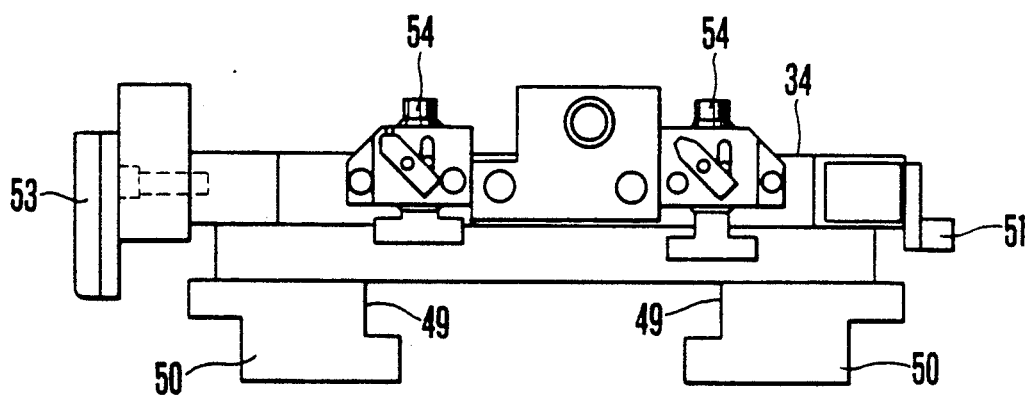
Figure 8:
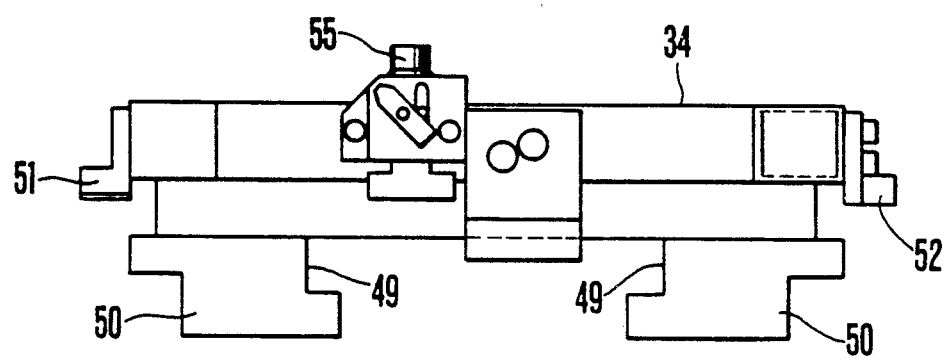
Figure 12:
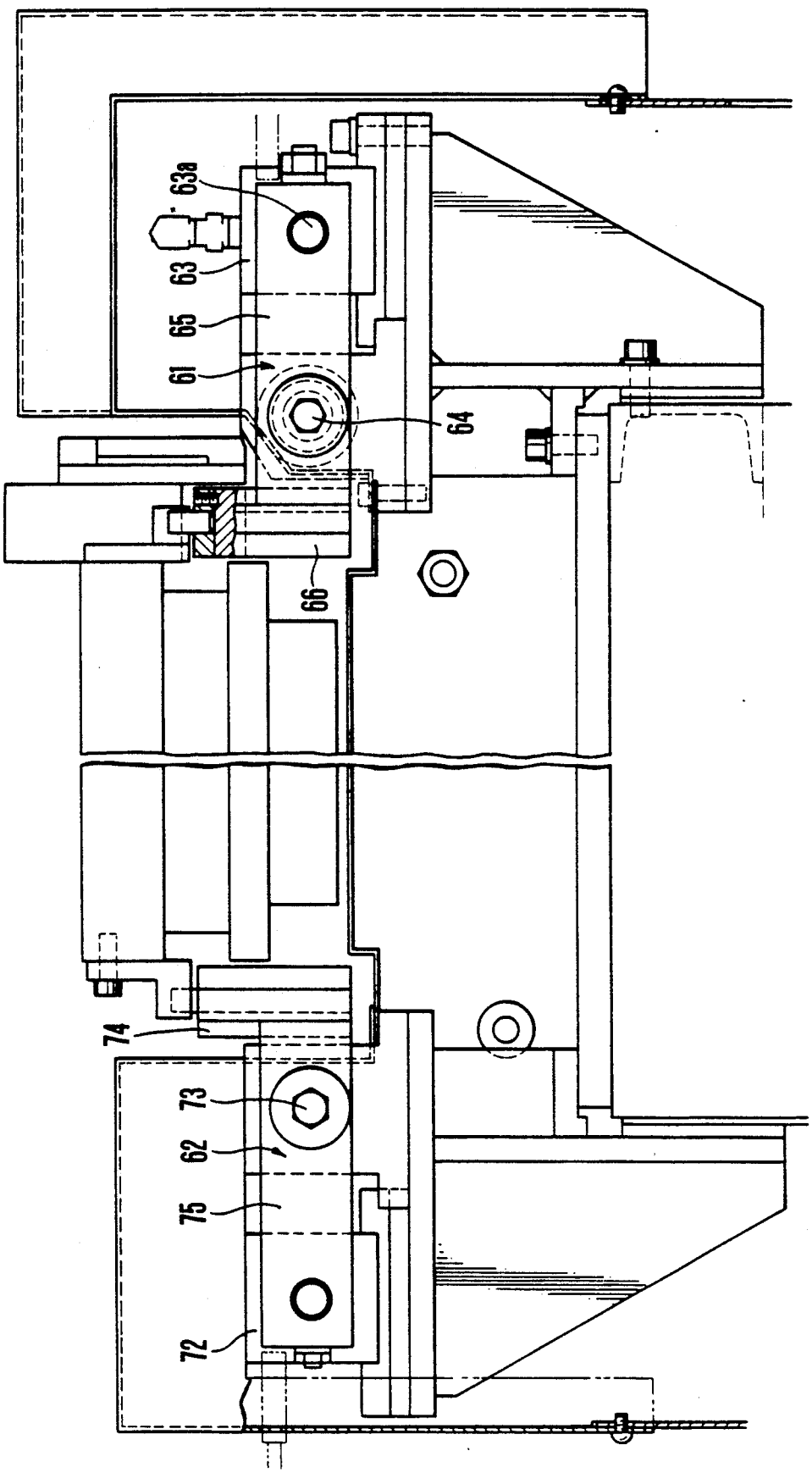
Figure 13:
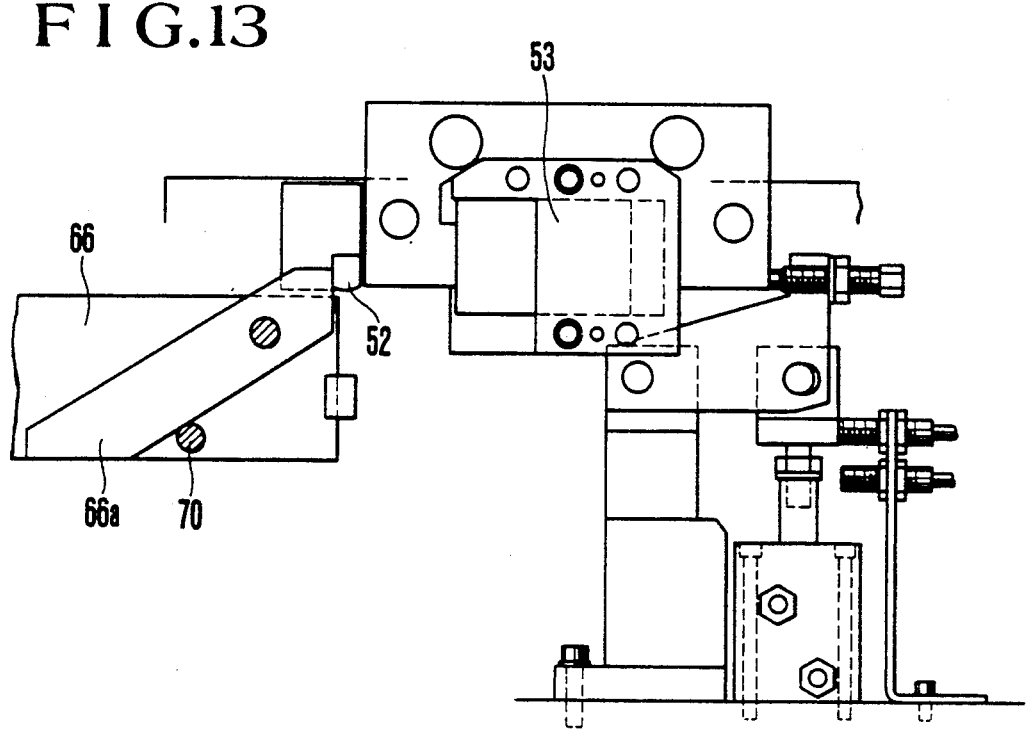
Figure 14:
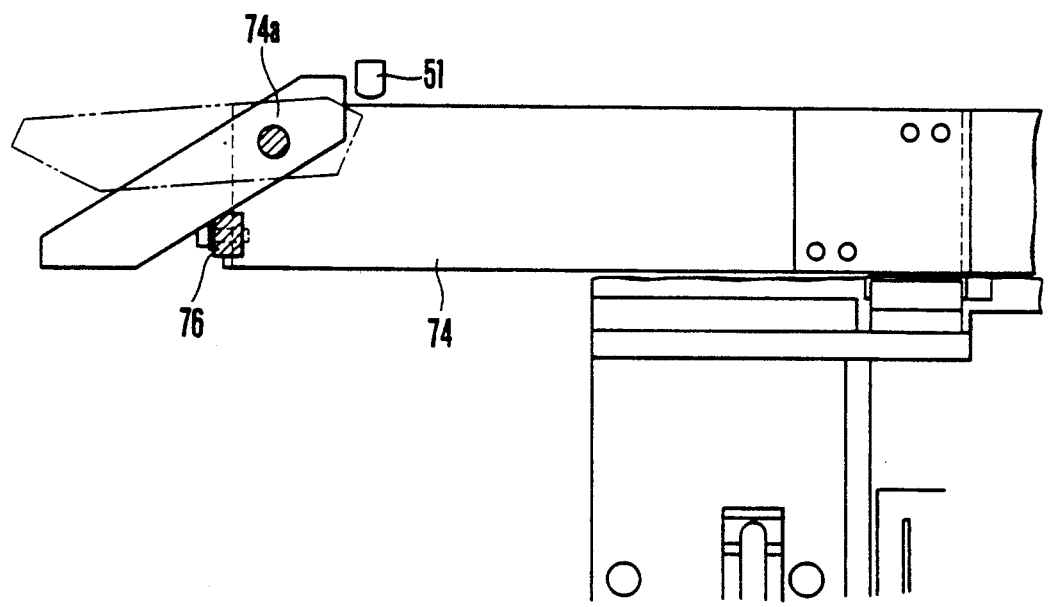
Figure 15:
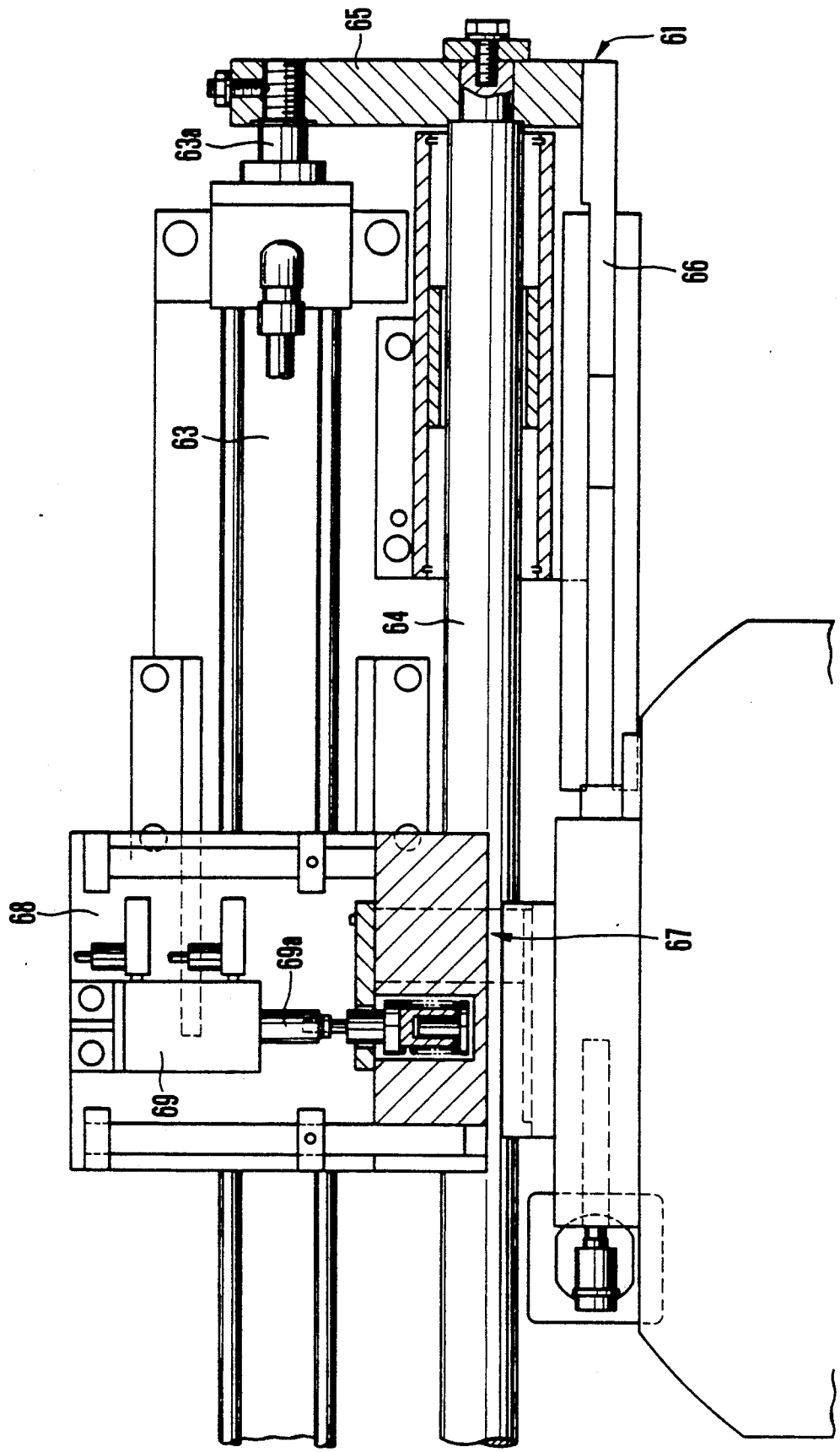

An embodiment of the present invention will be described in detail with reference to FIGS. 1 to 24.

As shown in FIGS. 1 to 4, a system 31 is constituted in such a manner that elevators 33 are disposed at two ends of a roller chain type of conveyance apparatus 32 which forms two stages having an upper and a lower side. The upper and the lower stages are moved in opposite directions to each other. The elevator 33 which is disposed on either of the ends of the roller chain type of conveying apparatus 32 is arranged to be moved only downwardly, while the other elevator 33 disposed to the other end is arranged to be moved only upwardly. As a result of this, trays 35 with pallets 34 on which the articles or workpieces to be produced are placed in such a manner that they can be moved perpendicularly to the direction of conveyance an can be arranged to be recycled, the pallets 34 being movable between the upper and the lower stages of the conveyance apparatus 32 by means of the elevators 33. Thus a free flowing conveyance apparatus is formed. An operation panel 36 of the conveyance apparatus 32 is disposed in the side portion at one end of the conveyance apparatus 32. In the side portion opposite to the position of the operation panel 36 of the conveyance apparatus 32, a preparation frame 37 is disposed which prepares the pallets 34 to be placed on the trays 35 on the conveyance apparatus 32. On the side on which the preparation frame 37 of the conveyance apparatus 32 is provided, one or more machining centers 38, an assembly device 39 comprising one or more articulated arm robots, and one or more washing devices 40 are disposed in a line. On the side on which the preparation frame 37 is disposed, a stocker 41 in which jigs and tools are accommodated and a stocker 42 in which parts to be assembled are accommodated are disposed so that supply of the jigs, tools and parts can be facilitated.

Tray locating devices 43 are respectively disposed at the position corresponding to the machining center 38, the assembly device 39, the washing device 40 and the preparation frame 37 disposed along the conveyance apparatus 32, the tray locating devices 43 being positioned at which the pallet 34 is introduced to and delivered from each of devices 38, 39, 40 and the preparation frame 37, and, furthermore, the same being positioned at which the pallet 34 waits for the ensuing process. Each tray locating device 43 comprises a stopper pin 44 which can be projected over the top surface of the conveyance apparatus 32 so that forward movement of the tray 35 can be stopped by operation of the tray locating device 43 so as to upwardly project the stopper pin 44. As a result of this, the tray 35 is slipped on the top surface of the conveyance apparatus 32, causing the position of the tray 35 to be fixed.

The tray 35 is formed in such a manner that two elongated plates 46 are disposed in parallel with each other on a flat plate. The plates 46 are secured in such a manner that the lengthwise direction of the plate 46 is made perpendicularly to the direction of conveyance of the tray 35. The plate 46 is each provided with a plurality of rollers 47 which are journalled on the outside part of the side surface in the upper portion of the plate 46. The plate 46 is each provided with, in the intermediate position thereof, a plurality of projecting members 48 each having a recessed top surface.

The pallet 34 is, as shown in FIGS. 5 to 10, formed in such a manner that the upper surface thereof is flattened, while the lower surface thereof is provided with securing members 50 in which a groove 49 is respectively formed so that the roller 47 of the tray 35 is engaged thereby. The side surface of tray 35 is formed in such a manner that the forward end surface thereof is provided with an introducing-arm securing member 51, while the rear end surface thereof is provided with a delivery-arm securing member 52 and a card attaching member 53. On the side confronting each of the devices in the direction of state-determining dogs 54 are provided so that each one dog corresponds to a device for producing the article On the other hand, on the side on which the devices are not provided, washing-state determining dogs 55 are provided. Threaded holes 56 penetrating from the top surface to the lower surface of the pallet 34 are each arranged to be screwed by a spring plunger 57 whereby center pins 58 which are each urged by a coil spring 57a in the direction projecting outwardly are projected downwardly over the lower surface of the pallet 34. As a result of this, the center pins 58 can be engaged with the recesses in the projecting members 48 provided in the tray 35.

At the position where stoppage is conducted by a tray locating device 43 of the conveyance apparatus 32, a hydraulic pressure cylinder driven introduction device 61 and a delivery device 62 are respectively provided as shown in FIGS. 11 to 15, said introduction device 61 and delivery device 62 moving the pallet 34 to the waiting position of the machining center 38 or the assembly machine 39. The introduction device 61 comprises an elongated hydraulic pressure cylinder 63 with a requisite stroke. The introduction device 61 further comprises a supporting shaft 64 parallel to the hydraulic pressure cylinder 63 so that the front end of a cylinder rod 63a of the hydraulic pressure cylinder 63 and an end of the supporting shaft 64 are connected by an introduction arm supporting member 65. An end of an introduction arm 66 parallel to the supporting shaft 64 and extending toward the central portion of the hydraulic pressure cylinder 63 is connected to an end of the introduction arm supporting member 65. Above the central portion of the hydraulic pressure cylinder 63, a card read/write device 67 is provided in such a manner that the card read/write device 67 can be freely moved from the hydraulic pressure cylinder 63 closer to the pallet 34 and separating from the same. The card read/write device 67 is connected with a cylinder rod 69a of an air pressure cylinder 69 which is secured to a supporting frame 68 which is disposed above the central portion of the hydraulic pressure cylinder 63. The introduction arm 66 has a front end thereof which is provided with a pallet pressing member 66a journalled at the position closer to this front end by a certain degree. At the position eccentric toward the introduction arm supporting member 65 with respect to the journalled position, a stopper 70 is disposed below the pallet pressing member 66a. As a result of this, the front end of the introduction arm is always raised by means of shift between the center of gravity of the pallet pressing member 66a and the jounalled position. The delivery device 62 is formed in such a manner that the hydraulic pressure cylinder 72, the supporting shaft 73 and the delivery arm 74 are reversely secured to the delivery arm supporting member 75, and a pallet pressing member 74a journalled at the position which is eccentric toward the rear end is disposed at the front end of the delivery arm 74. Furthermore, a stopper 76 is disposed below the pallet pressing member 74a at the position which is more adjacent to the delivery arm 74 than the journalled position. By virtue of shift between the center of gravity of the pallet pressing member 74a and the journalled position, the rear end of the delivery arm is always raised.

Figure 16:
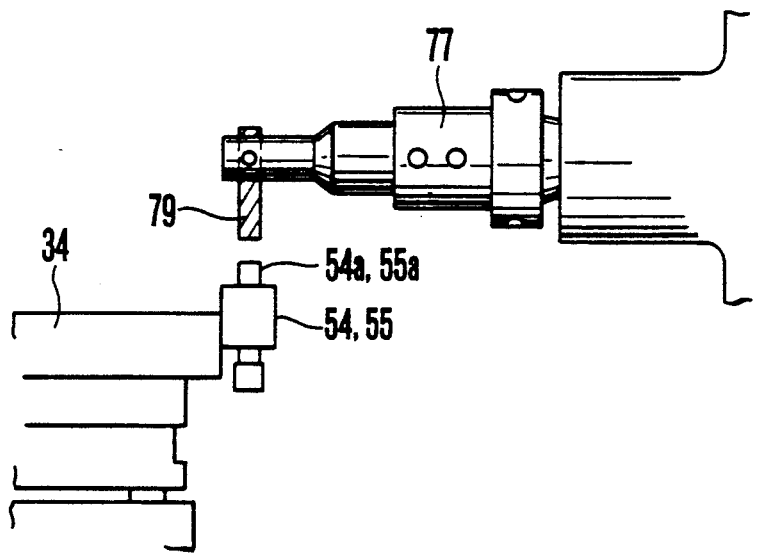
Figure 17:
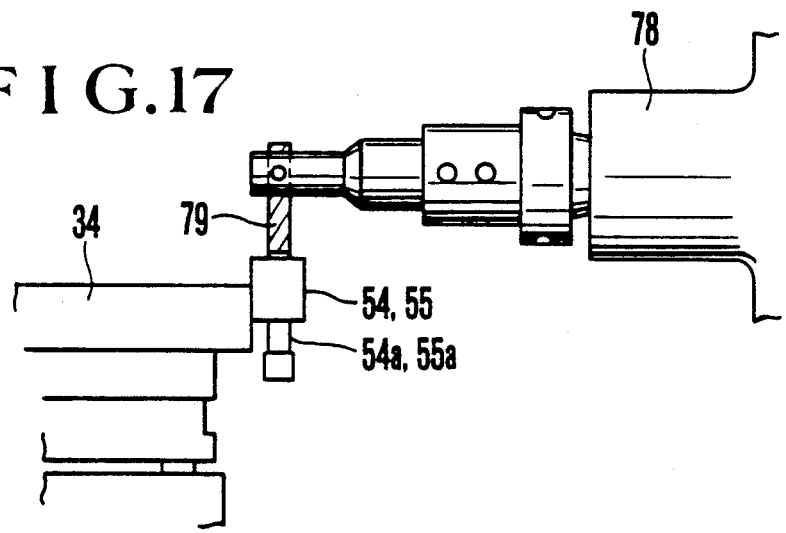

Each of the devices 38 and 39 is provided with, as shown in FIGS. 16 and 17, a dog pin pressing device 77 for activating each of dogs 54 and 55 provided for the pallet 34, or, in a case of a machining device such as the machining center 38, provided with a dog pin pressing member 79 by using a tool fitting member 78 such as a vertical head so that the dog pins 54a and 55a of the dogs 54 and 55 are respectively activated.

Figure 18:
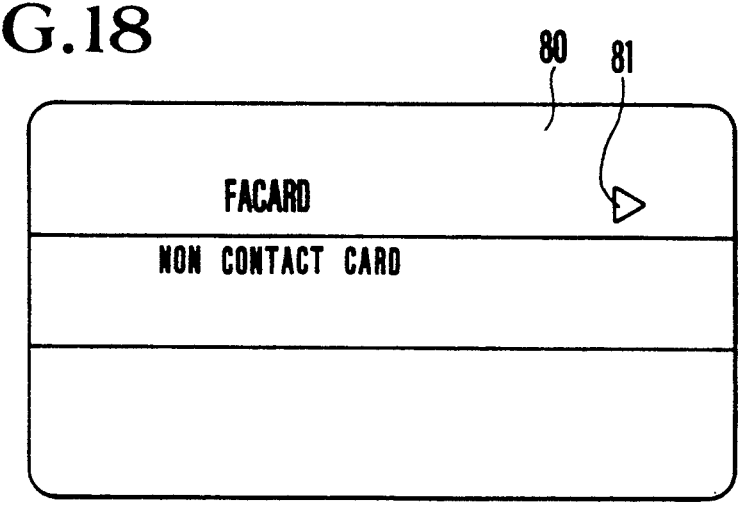

A card 80 to be attached to the pallet 34, as shown in FIG. 18, comprises a magnetic read type of card on which an integrated circuit is mounted. It includes as a main memory device a CMOS-RAM (Complementary Metallic Oxide Film Semiconductor Random Access Memory) with the storage capacity of 8K bytes to 64K bytes, and includes a battery so as to make the card 80 being able to be electrically charged. The surface of the card is provided with an arrow 81 designating the direction through which it is introduced into the card reading member 53 of the pallet 34. The entire surface of the same is covered with a plastic cover. A conductor for charging the battery is formed by means of some surface treatment along the periphery of said cover.

A control device for each device to be connected to the card read/write device 67 for reading and writing on the card is arranged in such a manner that in a case of a machining center 38, as shown in FIG. 1, a control device 85 to be connected to the card read/write device 67 of the machining center 38 is disposed in the side portion of the machining center 38 so that the remained subjected article to be machined read out from the card 80 is caused to be conducted, and information on the execution is written on the card 80. In a case of the assembly device 39, a control device 86 to be connected to the card read/write device 67 of the assembly device 39 is disposed in the side portion of the assembly device 39 so that the remained subjected article to be machined read out from the card 80 is caused to be conducted, and information on the execution is written on the card 80.

In the thus-constituted system 31 according to this embodiment, the conveyance apparatus 32 is always operated at a medium speed, the tray 35 is placed on the conveyance apparatus 32, the pallet 34 is placed on the tray 35 so that the pallet 34 is moved in accordance with the operation of the conveyance apparatus 32.

As shown in FIG. 19, in the preparation frame 37, when a demand of preparation is issued (step 91), it is determined whether the pallet 34 which has come closer to the preparation frame 37 has been washed (step 92). If the pallet 34 has been washed, the tray locating device 43 is operated at the position where the preparation frame 37 is positioned so as to project the stopper pin 44 (step 93), as a result of which, the pallet 34 and the tray 35 are stopped at the position of preparation (step 94). After this stoppage, the pallet 34 is taken to tee preparation frame 37 by hand (step 95), and the tray locating device 43 at the position where the preparation frame is positioned is operated, causing the stopper pin 44 to be released from its upward projection over the top surface of the conveyance apparatus 32 (step 96). As a result of this, recycle of the pallet 34 and the tray 35 is conducted again (step 97). If it is determined that the pallet 34 has not been washed, the flow jumps to step 97.

After preparation work has been conducted by the preparation frame 37, information on completion of the preparation is issued (step 98), and it is determined that whether an empty tray 35 has come closer to the preparation frame 37 (step 99). If an empty tray 35 has come closer, the tray locating device 43 at the position where the preparation frame is positioned is activated so that the stopper pin 44 is projected over the top surface of the conveyance apparatus 32 (step 100) and the tray 35 is stopped at the position where the preparation frame is positioned (step 101). After this stoppage, the pallet 34 is manually pushed from the preparation frame 37 toward the tray 35 (step 102), and the tray locating device 43 at the position where the preparation frame is positioned is activated, causing the stopper pin 44 to be released from its upward projection over the top surface of the conveyance apparatus 32 (step 103). As a result of this, the recycle of the pallet 34 and the tray 35 is conducted again (step 104).

Figure 21:
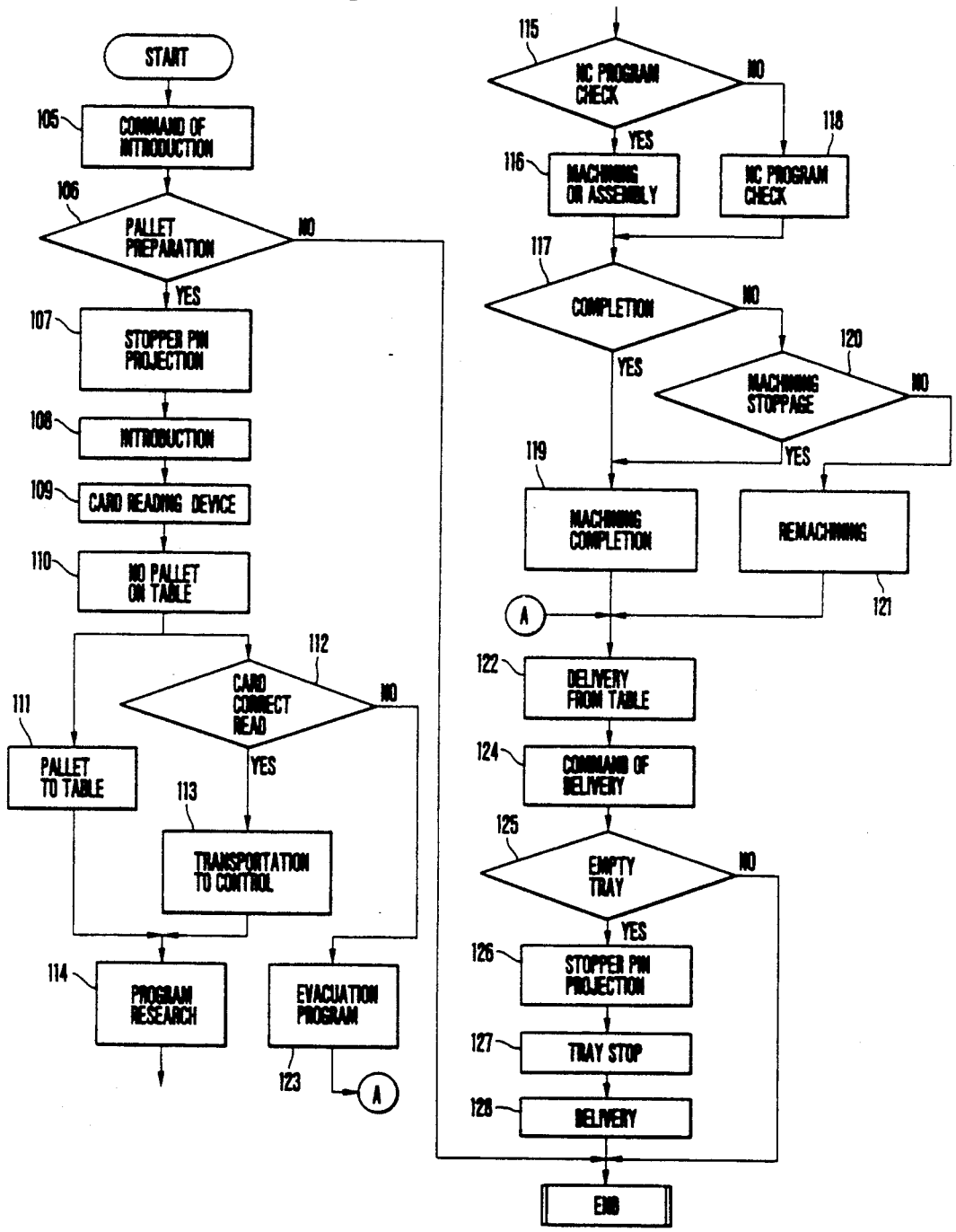

When the pallet 34 and the tray 35 which are recycling always come closer to the position where they can be introduced and delivered and demand on the introduction or delivery is issued, that is, when a command of introduction is issued as shown in FIG. 21 (step 105), it is determined whether the pallet 34 which has come closer to the introduction position has been subjected to the preparation process (step 106). In a case where the pallet 34 which has been subjected to the preparation process, the tray locating device 43 at the introduction position is operated, causing the stopper pin 44 to be projected over the top surface of the conveyance apparatus 32. As a result of this, the pallet 34 and the tray 35 are stopped at the introduction position (step 107). After this stoppage, the introduction device 61 is operated so that the pallet 34 is introduced into the introduction waiting positions 38a and 39a for each of the devices 38 and 39 (step 108). The card read/write device 67 is moved toward the card 80 attached to the pallet 34 which has been introduced into the introduction waiting positions 38a and 39a so that the stored data is read (step 109). In a case where no pallet 34 is present on working tables 38a and 39b of each of the devices 38 and 39 (step 110), the pallet 34 at the introduction waiting positions 38a and 39a is introduced toward the working tables 38b and 39b (step 111), and simultaneously it is determined whether the data on the card 80 has been correctly read (step 112). If the data has been correctly read, the articles to be machined are transported from the external memory device (memory pack) to the control devices 85 and 86 of each of the devices 38 and 39, or are transported to the control devices 85 and 86 of each of the devices 38 and 39 in the form of a numerical controlling program stored on the card 80 to serve per se articles to be machined (step 113). In the control devices 85 and 86, the head portion of the numerical controlling main program is searched (step 114) in order to determine whether the numerical controlling program is in a normal state by checking (step 115). If the numerical controlling program is normal, machining or assembly work is executed (step 116) and it is determined whether this work has been normally completed (step 117). If any abnormal point in the numerical controlling program in step 115 is checked, the programming check is stopped and the flow is shifted to the checking work of the completion of the work in step 117 (step 118). If the completion state is normal, it is determined that the requisite work has been completed, causing all of the state determination dogs 54 to be lowered, and simultaneously a fact that the machining (assembling) has been completed is written on the card 80 (step 119). It is determined whether the work has been stopped before completion or not. If it is stopped before completion, the flow is shifted to step 119 (step 120). If it is not stopped before completion, it is determined that the work can be conducted again, causing the state determination dog 54 for the device which has conducted the work to be lowered. Furthermore, a fact that the machining (assembling) needs to be conducted again is written on the card 80 (step 121). After the state determination dog 54 has been conducted as described above and the above-described fact has been written on the card 80, the pallet 34 is delivered from the working tables 38b and 39b to the delivery waiting positions 38c and 39c (step 122). If it is determined in step 112 that the card 80 has not been correctly read, an evacuation program is selected (step 123) so that the flow is jumped to step 122. When a command of delivery is issued after the pallet 34 is delivered to the delivery waiting positions 38c and 39c (step 124), it is determined that the empty tray 35 has come closer to the delivery stoppage position of the conveyance apparatus 32 (step 125). If the empty tray has come closer, the tray locating device 43 is operated so that the stopper pin 44 is projected upwardly over the top surface of the conveyance apparatus 32 (step 126). As a result of this operation, the empty tray 35 is stopped at the delivery stoppage position (step 127). After the empty tray 35 has been stopped, the delivery device 62 is operated, causing the pallet 34 to be delivered from the delivery waiting positions 38c and 39c to the empty tray 35 (step 128). If washing needs to be conducted in addition to machining and assembling, the washing device 40 is treated in a manner similar to the description above.

Figure 22:
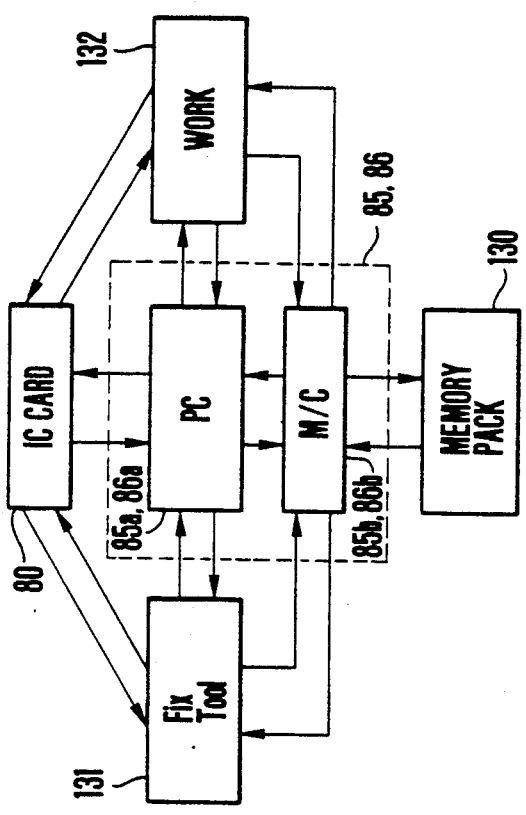

The treatment of data on the card 80 is conducted as shown in FIG. 22 in such a manner that data is input/output between the card 80 and programmable controllers or microcomputers 85a and 86a included in the control devices 85 and 86. Data is input/output between the programmable controllers or the microcomputers 85a and 86a and the numerical control device 85b and 86b of the machining center 38, assembly device 39 and other numerically controlled machines. The numerical control devices 85b and 86b serve as external memory device which inputs/outputs the requisite articles to be processed to and from the memory pack 130 of the on-line controller disposed in the central control room. The numerical control devices 85b and 86b has correlation with each other in selecting tools 131, and also has correlation with material 132 of each product at the time of machining and assembly. In order to clarify the article to be processed, the programmable controllers or the microcomputers 85a and 86a each has correlation with the tools 131 and the material 132 of each product. The above-described correlation is specifically realized by means of the card 80. By controlling the card 80 by person, a flexible control can be conducted.

Figure 23:
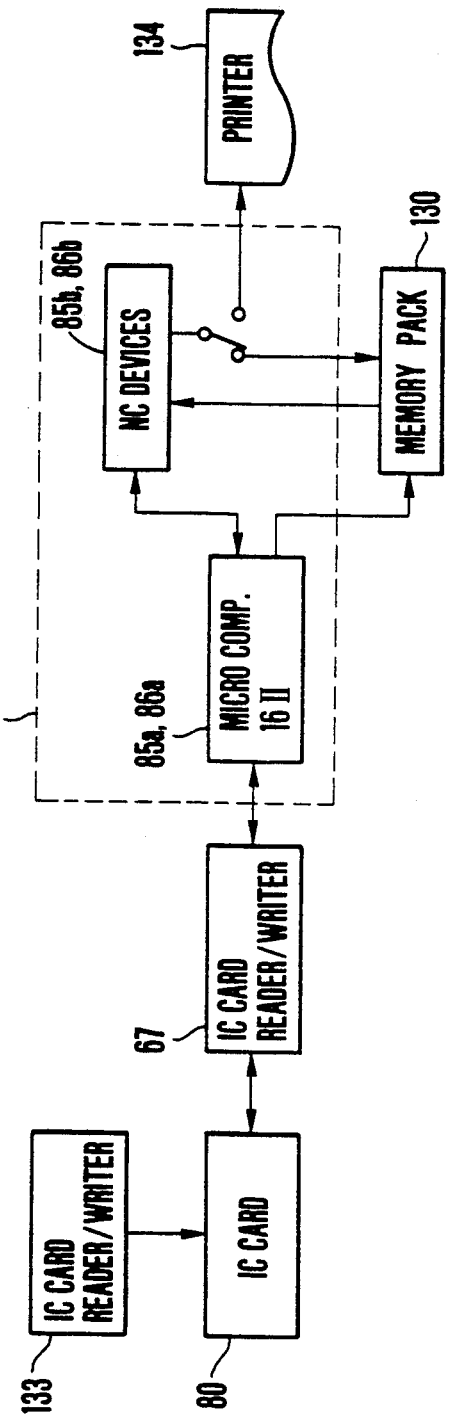

Specifically, the above-described procedure is, as shown in FIG. 23, conducted in such a manner that with a card reader/writer 133 formed in portable computers disposed to the preparation frame 37 or at the position adjacent to the same, requisite information such as information which is required for machining or assembly, information required for preparation, and information on measurement are written. On the other hand, with a card read/write device 67 disposed to each of the devices 38 and 39 and the like, the above-described information is read so as to be input to the microcomputers 85a and 86a. The microcomputers 85a and 86a activate the numerical control devices 85b and 86b and the memory pack 130 so that the control sequence is transformed between the numerical control devices 85b and 86b, memory pack 130 or the card 80 in correspondence with the requirement. A printer 134 or the like of the on-line controller outputs the results in correspondence with the requirement.

Figure 24:
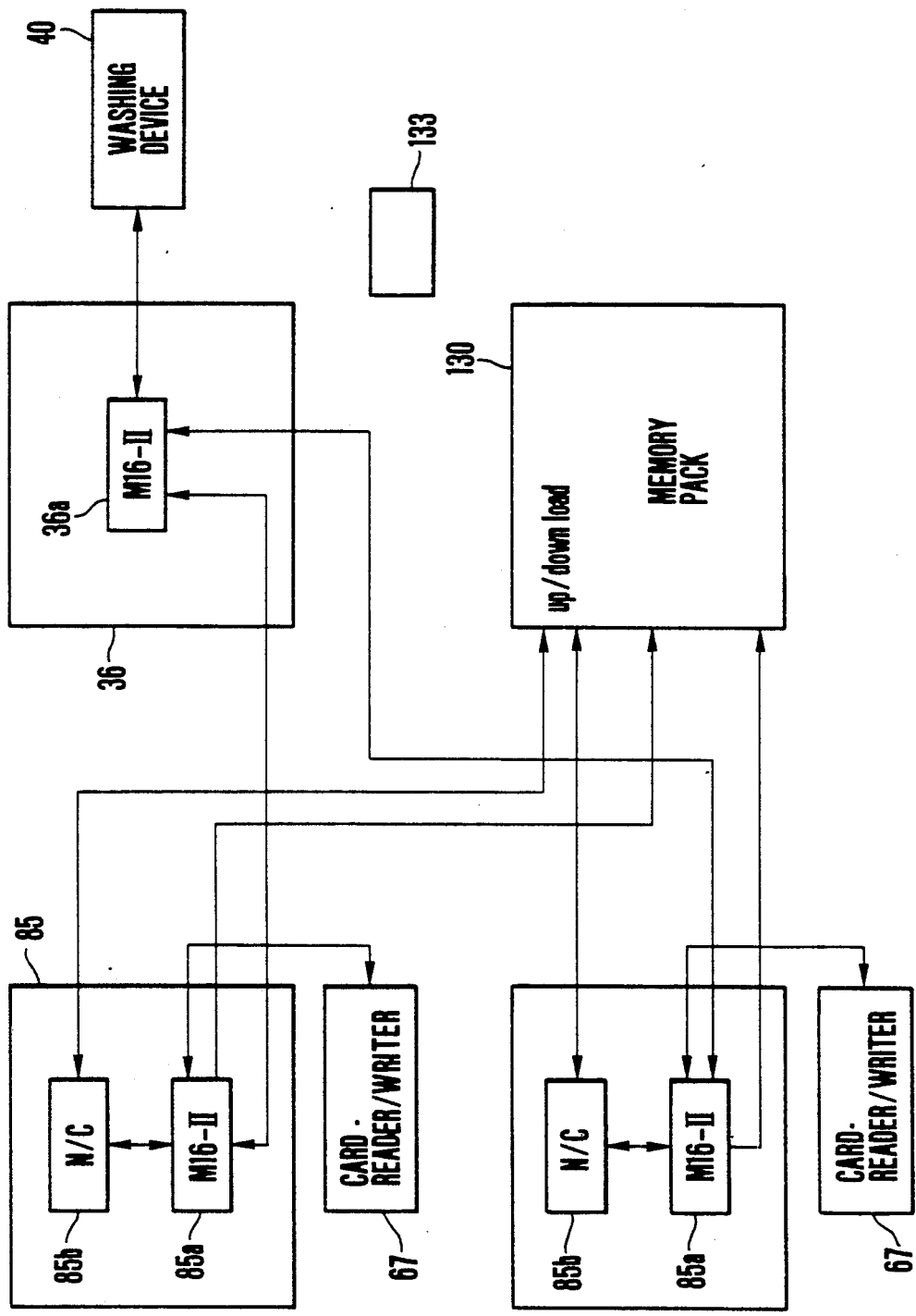
Figure 25:
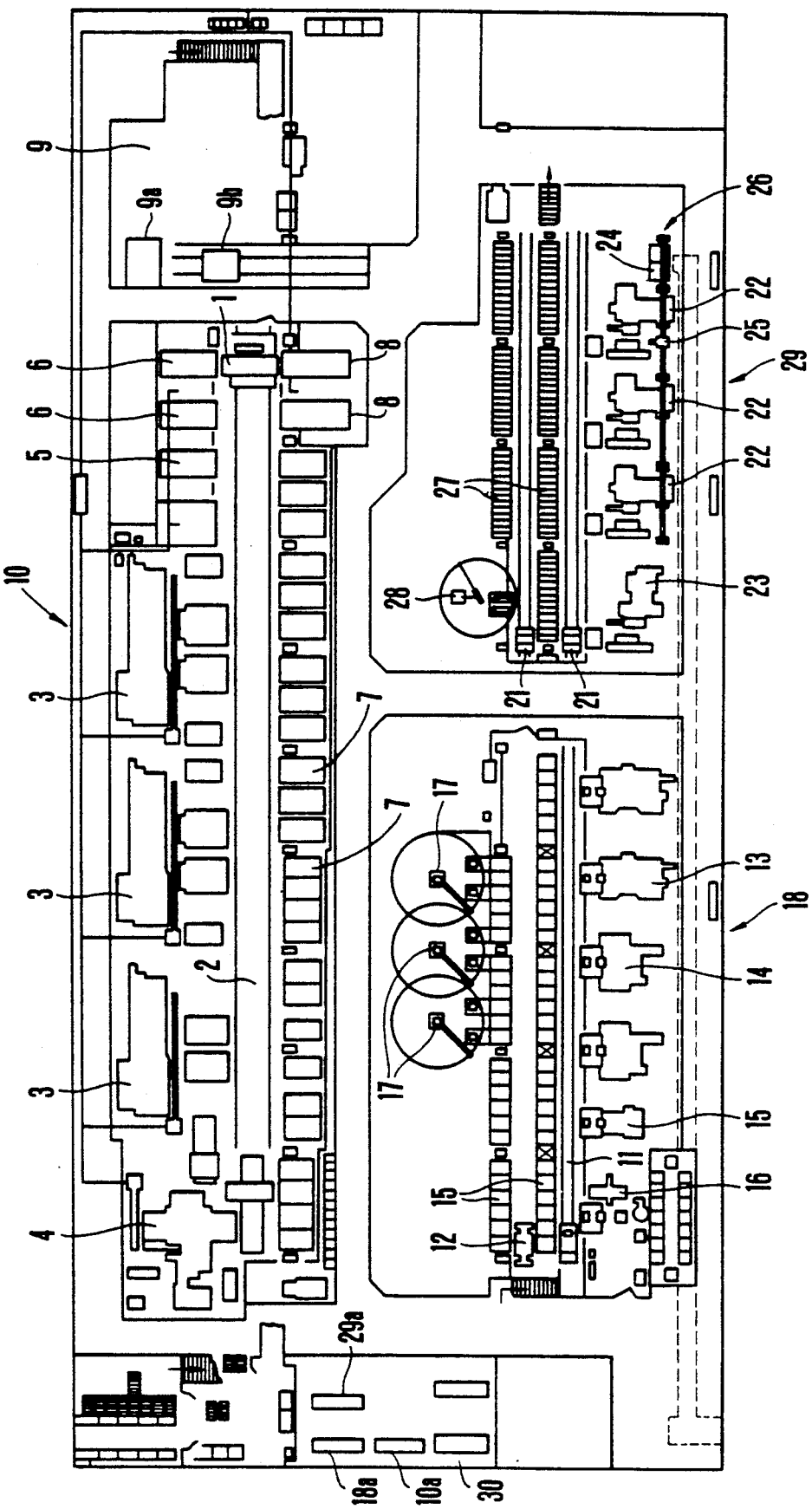
FIG. 25 is a plan view illustrating the distribution of the conventional automated machining facilities.

In a case where a plurality of devices of the same type is disposed along the conveyance apparatus 32, information read by the card read/write devices 67 and 67 provided for each device are, as shown in FIG. 24, transported from the microcomputers 85a and 85a of each of the control devices 85 and 85 to the numerical control devices 85b and 85b and the memory pack 130. The control sequence is input/output between the numerical control devices 85b and 85b and the memory pack 130 in correspondence with the demand on sequence. The relative states are input/output between the microcomputer 36a provided for the operation panel 36 of the conveyance apparatus 32 and the microcomputers 85a and 85a of the control devices 85 and 85. Furthermore, the relative states are input/output between the washing device 40 and the microcomputer 36a provided for the control panel 36 of the conveyance apparatus 32. Information for the card 80 to be attached to each pallet 34 is given by a card reader/writer 133 which is individually provided or the card read/write devices 67 and 67 which is provided for each device.

In the above-described system 31 according to this embodiment, since it can be operated depending upon information on the card 80 in which read/write can be freely conducted and which is attached to the pallet 34, the quality or the sequential order of the product of the pallet 34 which is conveyed by the conveyance apparatus 32 can be determined in such a manner that an operator can manage the determination by means of the card. Therefore, the degree of liberty can be significantly improved and response work such as change or the like can be facilitated, causing the article and information can be easily made coincide with each other. Since the pallets 34 and the trays 35 are recycled through the conveyance apparatus 32 which is formed in a two-stage manner, this system serves as not only a conveyance means but also a stocker, causing the entire space to be reduced. Furthermore, since the data on information on preparation, information on machining (assembly), data on state of machining (assembly), information on shape and dimensions for use in manufacture can be obtained. Since the introduction and delivery to and from, the pallet 34 which is being moved can be conducted, change at the time of preparation can be facilitated. Consequently a significantly flexible system can be achieved which can easily correspond to the mixed flow of multiple types of articles, changes in load, and/or changes in schedule. Therefore, control and administration system can be simplified. Furthermore, each device is provided significantly independent, causing increase or the like can be easily conducted. Therefore, the system according to this invention exhibits high capability of improving in facilities.

What is claimed is:

1. A free flowing production system comprising:
   at least one pallet, adapted to hold a workpiece thereon;
   an endless-running conveying apparatus adapted to hold a plurality of said pallets, to have workpieces in finished and unfinished conditions placed mixedly on a surface of said conveying apparatus;
   at least one tray, adapted to hold said at least one pallet thereon, and directly placed on the surface of said conveying apparatus and formed such that pallets can be introduced and ejected from the tray for beginning and ending production of the workpiece;
   at least one shifting device provided on each said pallet, having an adjustable position structure which has a position which can be moved between projecting or not projecting, by a manual or an automatic operation;
   a variety of automatic production machines, disposed along said conveying apparatus, each said machine providing means for introducing and ejecting a pallet, each said automatic production machine including means for moving said position of said shifting device on a pallet which has passed therethrough, such that a position of said adjustable position structure is shifted when each machine finishes its production process;

an information apparatus, placed adjacent to one of said means for introducing and ejecting said pallet, for determining information indicative of a position of said shifting device and for allowing a pallet to proceed to a machine only when said position of said shifting device is not shifted;

an information card detachably attached to said pallet, and capable of repeated reading and writing operations, said information card including means for storing information indicative of an operation to be performed to said workpiece on said pallet on a particular machine;

a read/write apparatus, placed in a vicinity of said means for introducing and ejecting said pallet, for reading from and writing to said information card;

control means for transmitting said information read from said information card to said machine and for operating said machine based thereon, and writing information indicative of said operating to said information card;

wherein said information card on said pallet is written from a state indicative of an unfinished condition to a state indicative of a finished condition when an operation thereon is completed.

2. A system as in claim 1 wherein said variety of automatic production machines include at least a machining center and an assembly machine.

3. A system as in claim 1 wherein said shifting device comprises a pin which has one position indicative of a finished operation and another position indicative of an unfinished operation.

4. A system as in claim 3 where one of said shifting devices is provided for each of a plurality of production processes which are to be performed.

5. A device as in claim 4 wherein said information apparatus comprises means for detecting whether said pin is projecting or not projecting.

6. A system as in claim 1 wherein said conveying apparatus is formed as two stages having an upper and lower sides moving in opposite directions and two elevators arranged to be moved downwardly and upwardly.

7. A system as in claim 1 wherein said information card is a memory device of a complementary metallic oxide film semiconductor random access memory and covered with a plastic cover.

* * * * *